Patented July 4, 1933

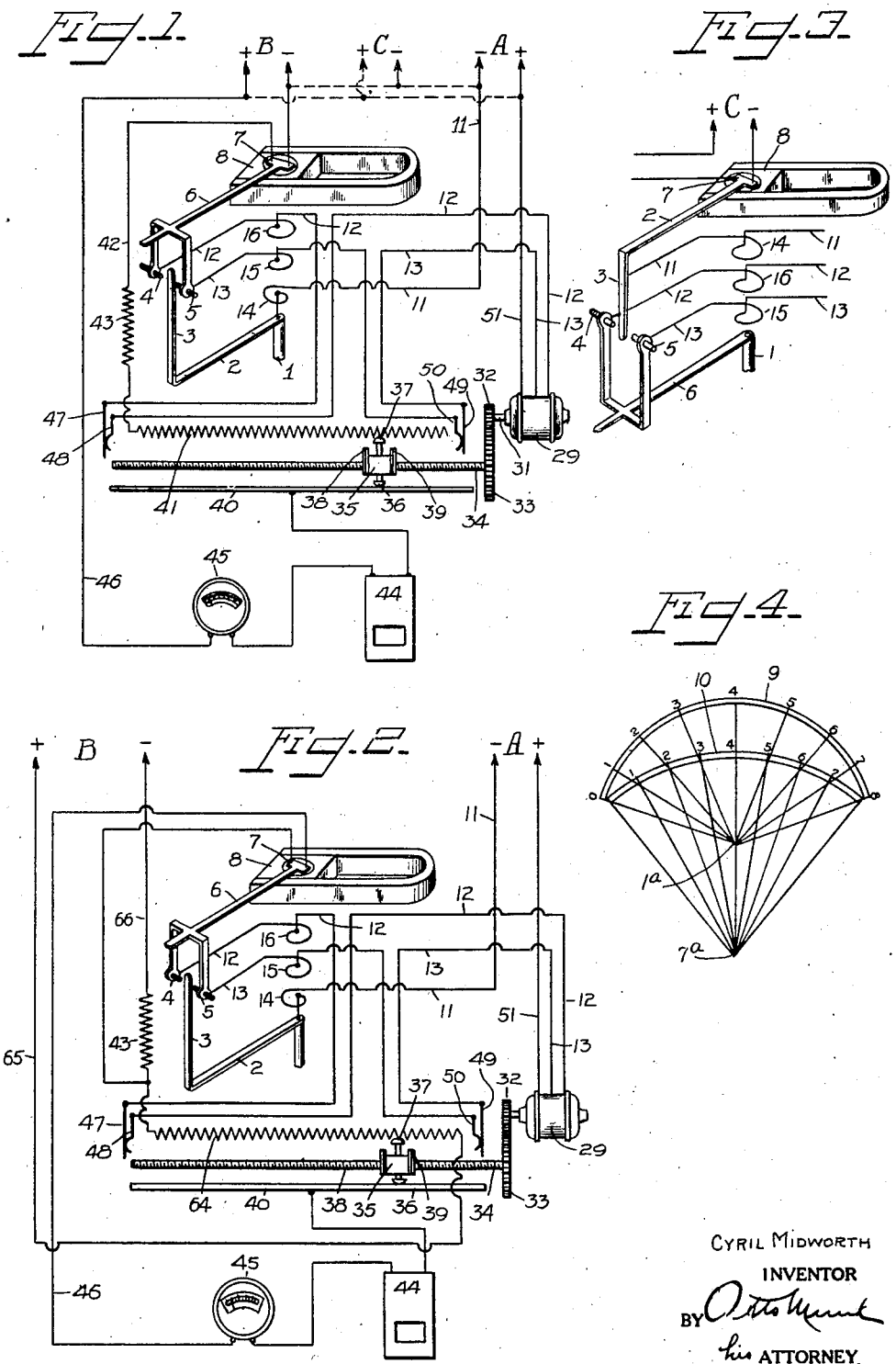
July 4, 1933.  C. MIDWORTH  1,916,737
INSTALLATION FOR REPEATING INDICATIONS OF MOVEMENT AT A DISTANCE
Filed May 28, 1926
CYRIL MIDWORTH
INVENTOR
BY
his ATTORNEY.

1,916,737

UNITED STATES PATENT OFFICE

CYRIL MIDWORTH, OF LONDON, ENGLAND, ASSIGNOR TO EVERSHED & VIGNOLES, LIMITED, OF LONDON, ENGLAND

INSTALLATION FOR REPEATING INDICATIONS OF MOVEMENT AT A DISTANCE

Application filed May 28, 1926, Serial No. 112,417, and in Great Britain February 11, 1926.

This invention relates to improvements in installations for repeating indications at a distance.

One object of the invention is to obtain greater accuracy in installations of this type.

Another object of the invention is an improved installation to which any number of suitable indicators can be added or from which any number of indicators can be subtracted within practical limits without in any way affecting the accuracy of the indicators included after variation.

A further object of the invention is the provision of means whereby the scale law of the repeated indications can be varied relatively to the scale law of the angular movements to be repeated.

An additional object of the invention is an improved installation which is unaffected by variations in the voltage supplying the circuit including the repeating instruments the accuracy of which remains unchanged notwithstanding any variations in the line resistance due to added instruments, increased length of line or variations in weather, temperature, or climatic conditions.

Another object of the invention is an installation of the kind specified in which all the repeaters are associated with the main instrument or master repeater by two conductors only.

Another object of the invention is to provide an installation having distant indicators each or any of which can be replaced by time quantity integrating apparatus which will give results similar to those obtained at the master instrument.

In the drawing:—

Figure 1 illustrates diagrammatically one arrangement according to this invention.

Figure 2 illustrates diagrammatically a modified installation according to this invention.

Figure 3 is a fragmentary view illustrating a variation.

Figure 4 illustrates diagrammatically the means by which the scale law of the indication to be repeated can be varied.

Referring to Figure 1, 1 is the shaft, the angular movements of which are to be repeated at a distance, the shaft 1 being provided with an arm 2, having a contact tongue 3 at the free end thereof. The contact tongue 3 is located between two contacts 4 and 5 carried by an arm 6 projecting from the electrically responsive moving part 7 of an instrument 8 hereinafter called the master repeater.

The axis of the moving part 7 of the master repeater 8 is arranged concentrically with the axis of the shaft 1 as illustrated in Figure 1 and accordingly the scale law of the angular movements of the arm 6 will be similar to the scale law of the angular movements of arm 2.

The master repeater 8 is a current operat' electrical movement of any kind suitable for inclusion with other current operated electrical movements in series in an electrical circuit.

In Figure 1 current is conveyed to and from the contacts 3, 4, and 5 through the conductors 11, 12, and 13 respectively which conductors include ligaments 14, 15, and 16 respectively so as to allow of angular movement.

The conductor 11, as illustrated, is connected directly with the negative of source of supply A, and the conductors 12 and 13 electrically associate the field winding of the motor 29 with the contacts 4 and 5. The motor 29 has a split field winding the positive of supply A being taken to the junction of the two halves by a conductor 51.

The armature shaft 31 of the motor 29 is provided with a pinion 32 which meshes with a spur wheel 33 mounted on a screwed shaft 34.

The screwed shaft 34 has a carriage 35 mounted thereon the hole through said carriage being threaded so that when the shaft 34 is rotated in one direction the carriage 35 is displaced towards say the left and when the shaft 34 is rotated in the other direction the carriage 35 is displaced towards the right.

The carriage 35 is provided with two contacts 36 and 37 and two projections 38 and 39; the contact 36 rubs on the contact bar 40 and the contact 37 engages with the resistance 41, one end of which is connected to one end of the winding of the electrical movement of the master repeater 8 by a conductor 42 which includes in series a resistance 43 the value of which in some cases may be zero.

The other end of the winding of the electrical movement of the master repeater 8 is connected with one pole, say the negative, of supply B, the said winding being in series with the windings of the repeating instruments 44, 45, the terminal end of the winding of the last of which is connected to the other pole, in this case with the positive, of supply B by the conductor 46.

When the carriage 35 is displaced to the extreme left hand position in Figure 1 the projection 38 engages with the blade 47 and presses it away from the contact 48 so as to interrupt the circuit through the conductor 12 thus preventing the contact 37 from leaving the resistance 41 which would put the installation out of operation. Similarly when the carriage 35 is displaced to the extreme right hand position the projection 39 engages with the blade 49 and presses it away from the contact 50 so as to interrupt the circuit through the conductor 13.

When an installation arranged as illustrated in Figure 1 is energized and the shaft 1 is angularly displaced to press the tongue 3 against the contact 4 current will flow from the negative of supply A through conductor 11, arm 2, tongue 3, contact 4, conductor 12, blade 47, contact 48, the armature winding and one half of the split field winding of the motor 29 and through conductor 51 to the positive of supply A.

This will result in the armature of the motor 29 rotating in one direction and displacing the carriage 35 so as to vary the value of the resistance 41 until the current in the circuit supplied from the source B is such that the electrically responsive moving part 7 of the master repeater 8 angularly displaces the arm 6 and moves the contact 4 away from the tongue 3. As soon as this occurs the armature of the motor 29 will cease rotating. It follows that as the master repeater 8 and the repeaters 44 and 45 are all in series with one another they will all be equally influenced and give similar indications.

In the installation diagrammatically illustrated in Figure 2 the series resistance 41 is replaced by a resistance 64 the right hand end of which is connected with the positive of supply source B by a conductor 65 whilst the other end of 64 is connected with the negative of supply source B by a conductor 66, a fixed resistance 43, the value of which may be zero in some cases, being included in the circuit in series with the resistance 64.

It will be seen that the resistance 64, the contacts 37, 36 and the contact bar 40 form a potential divider, the master repeater 8, the repeaters 44 and 45 and that part of the resistance 64 to the left of the contact 37 being all connected to one another in series circuit which is energized from the source of supply B through the resistance 43 so that the position of the arm 6 of the master repeater 8 is dependent upon the position of the contact 37 on the resistance 64.

Obviously if the voltage and character of the sources A and B are similar then the positives and negatives can all be supplied from a single main source C as indicated in dotted lines in Figure 1.

Alternatively the arm 2 and contact tongue 3 can in all cases be mounted on the moving part 7 of the master repeater 8 and the arm 6 having the contacts 4 and 5 can be mounted on the shaft 1 as illustrated in Figure 3 and the polarities of the sources of supply may be reversed without in any way departing from the invention.

It will be obvious that any variations in the supply voltage or any variation in the line resistance incidental to a change in the number of repeaters, change of temperature or other cause will produce the same cycle of events as a movement of the device to be repeated and so restore the current and the deflections of all the repeaters to the value they had before the variation.

With the arrangement of parts illustrated diagrammatically in Figures 1, 2 and 3 the scale law of the angular movement of the arm 6 is similar to the scale law of the angular movement of the arm 2 but this state of affairs can be modified in a variety of ways for example, referring to Figure 4, 1a is the axis of the shaft 1, 7a is the axis of the moving part 7 of the master repeater 8, 9 a segmental band having numerals "1", "2", "3" .... "8" located to indicate certain angular positions of the shaft 1 and showing a scale law which closes up at the terminals thereof and 10 a segmental band having equivalent numerals "1", "2", "3" .... "8" substantially equally spaced owing to the displacement of the axes 1a and 7a relatively to one another thus enabling the master repeater 8 to transmit indications which follow a straight line scale law.

I claim:—

1. An installation for repeating indications at a distance having in combination a plurality of devices each having an angularly moving part which are electrically responsive to variations in current flow and have similar electrical and mechanical characteristics, contacts on the angularly moving part of one of said devices, contacts on the device the angular movements of which are to be repeated at a distance for cooperation with the first named contacts, an electrical resistance, a contactor for said resistance, a reversible electric motor for displacing said contactor along said resistance, and a source of electrical energy, the supply of current to said motor being controlled by the cooperating contacts so that movement of the contactor is interrupted when the value of that part of the resistance which is connected electrically in series with all the electrically responsive devices and a source of electrical energy allows a current to flow directly proportional in value to the degree of movement to be repeated thus similarly deflecting the moving parts of all the electrically responsive devices.

2. An installation for repeating indications at a distance having in combination a plurality of devices each having an angularly moving part which are electrically responsive to variations in current flow and have similar electrical and mechanical characteristics, contacts on the angularly moving part of one of said devices, contacts on the device the angular movements of which are to be repeated at a distance for cooperation with the first named contacts, an electrical resistance, a source of electrical energy connected to the ends of said electrical resistance, a contactor for said resistance, a reversible electric motor for displacing said contactor along said resistance, and a source of electrical energy, the supply of current to said motor being controlled by the cooperating contacts so that movement of the contactor is interrupted when the value of that part of the resistance which is connected electrically in series with all the electrically responsive devices and the first mentioned source of electrical energy allows a current to flow directly proportional in value to the degree of movement to be repeated thus similarly deflecting the moving parts of all the electrically responsive devices.

3. An installation for repeating indications at a distance having in combination a plurality of devices each having an angularly movable part which are electrically responsive to variations in current flow and have similar electrical and mechanical characteristics, contacts on the angularly moving part, a separate similarly movable device, which is externally energized and arranged coaxially with one of said devices, contacts on the angularly moving part of said last named device for cooperation with the contacts on the externally energized device for repeating the angular movements of the externally energized device, an electrical resistance, a contactor for said resistance, a reversible electric motor for displacing said contactor along said resistance and a source of electrical energy, the supply of current to said motor being controlled by the cooperating contacts so that movement of the contactor is interrupted when the value of that part of the resistance which is connected electrically in series with the electrically responsive repeating devices and a source of electrical energy in a closed circuit allows a current to flow in said circuit which is directly proportional in value to the degree of movement of the externally energized electrically responsive device thus similarly deflecting the moving parts of all the electrically responsive repeating devices.

4. An installation for repeating indications at a distance having in combination a plurality of devices which are electrically responsive to variations in current flow and have similar electrical and mechanical characteristics, each of said devices having an angularly movable part, contacts on the angularly moving part of a separate similarly movable device, which is externally energized and arranged coaxially with one of said devices, contacts on the angularly moving part of said last named device for cooperation with the contacts on the externally energized device for repeating the angular movements of the externally energized device, an electrical resistance, a source of electrical energy connected to the ends of said electrical resistance, a contactor for said resistance, a reversible electric motor for displacing said contactor along said resistance and a source of electrical energy, the supply of current to said motor being controlled by the cooperating contacts so that movement of the contactor is interrupted when the value of that part of the resistance which is connected electrically in series with the electrically responsive repeating devices and the first mentioned source of electrical energy in a closed circuit allows a current to flow in said circuit which is directly proportional in value to the degree of movement of the externally energized electrically responsive device thus similarly deflecting the moving parts of all the electrically responsive repeating devices.

5. A telemetric system comprising a movable member, and a series circuit including a plurality of electric current responsive repeaters and a variable impedance, means for supplying current to said circuit, electrical power means having an energizing circuit, for varying the adjustment of said variable impedance, and control means responsive to movement of said member in one direction for causing said power means to decrease the value of said impedance and responsive to movement of said member in the opposite direction for causing said power means to increase the value of said impedance, said control means comprising a plurality of electric contacts coupled to one of said repeaters for movement thereby and cooperating contacting means carried by said movable member, said electric contacts and contacting means being interposed in said energizing circuit.

6. A telemetric system comprising a member the movement of which it is desired to indicate at a distance, a plurality of repeaters of similar electric and mechanical characteristics and a variable impedance, connected in series, each of said repeaters having a movable part the movement of which is proportional to the strength of the energizing current, a reversible motor, a source of electrical energy passing current through said variable impedance, a driving connection between said motor and the adjustable part of said impedance, a source of electrical energy for said motor, and means for interconnecting said motor and said source, said means comprising a plurality of contacts carried by the moving part of one of said repeaters and cooperating contacts carried by said member, the arrangement of said contacts being such that upon advance movement of said member, said motor rotates in one direction to vary said impedance in one sense and cause an increase of current through said repeaters, and upon reverse movement of said member rotates in the opposite direction to vary said impedance in the opposite sense and decrease the current through said repeaters.

7. A system in accordance with claim 6 wherein the first mentioned source of electrical energy is connected in series with said impedance and said repeaters.

8. A system in accordance with claim 6 wherein the first mentioned source of electrical energy is connected to the ends of said impedance.

9. A system in accordance with claim 6 wherein means is provided for rendering said motor inactive in response to extreme adjustment of said impedance in either sense.

C. MIDWORTH.